(No Model.) 2 Sheets—Sheet 1.

W. LAWRENCE.
CLOSED CONDUIT FOR ELECTRIC RAILWAYS.

No. 516,631. Patented Mar. 13, 1894.

(No Model.) 2 Sheets—Sheet 2.

W. LAWRENCE.
CLOSED CONDUIT FOR ELECTRIC RAILWAYS.

No. 516,631. Patented Mar. 13, 1894.

Witnesses:
Mark M. Decker
E. E. Weares

Inventor,
Wm Lawrence
By Fred Barker
Attorney.

UNITED STATES PATENT OFFICE.

WILLIAM LAWRENCE, OF NEW YORK, N. Y., ASSIGNOR TO THE LAWRENCE ELECTRIC COMPANY, OF SAME PLACE.

CLOSED CONDUIT FOR ELECTRIC RAILWAYS.

SPECIFICATION forming part of Letters Patent No. 516,631, dated March 13, 1894.

Application filed May 2, 1893. Serial No. 472,767. (No model.)

*To all whom it may concern:*

Be it known that I, WILLIAM LAWRENCE, a citizen of the United States, residing at New York, in the county and State of New York, have invented certain new and useful Improvements in Systems of Electric Distribution, of which the following is a full, clear, and exact specification.

My invention relates to improvements in underground electric power systems for cars and other vehicles, and consists first, in forming what I please to term the working conductor or feed wire in sections, the said sections having suitable insulated material between them to prevent the electric current from running from one section into the adjacent section; second, in supplying the said sections with electricity from a continuous live wire which is insulated and incased within a suitable tubing or its equivalent, and third, in conveying the electricity from the said live wire into a suitable cut-out box from which it is delivered to the auxiliary wire as the car passes over the different sections. A suitable conveyer provided with grooved contact wheels is employed for conveying the current from the auxiliary wire to the current distributer of a car or other vehicle.

I will now proceed to describe my invention in detail, referring to the accompanying drawings forming a part of this specification, and in which similar letters of reference indicate corresponding parts in all the figures.

Figure 1:
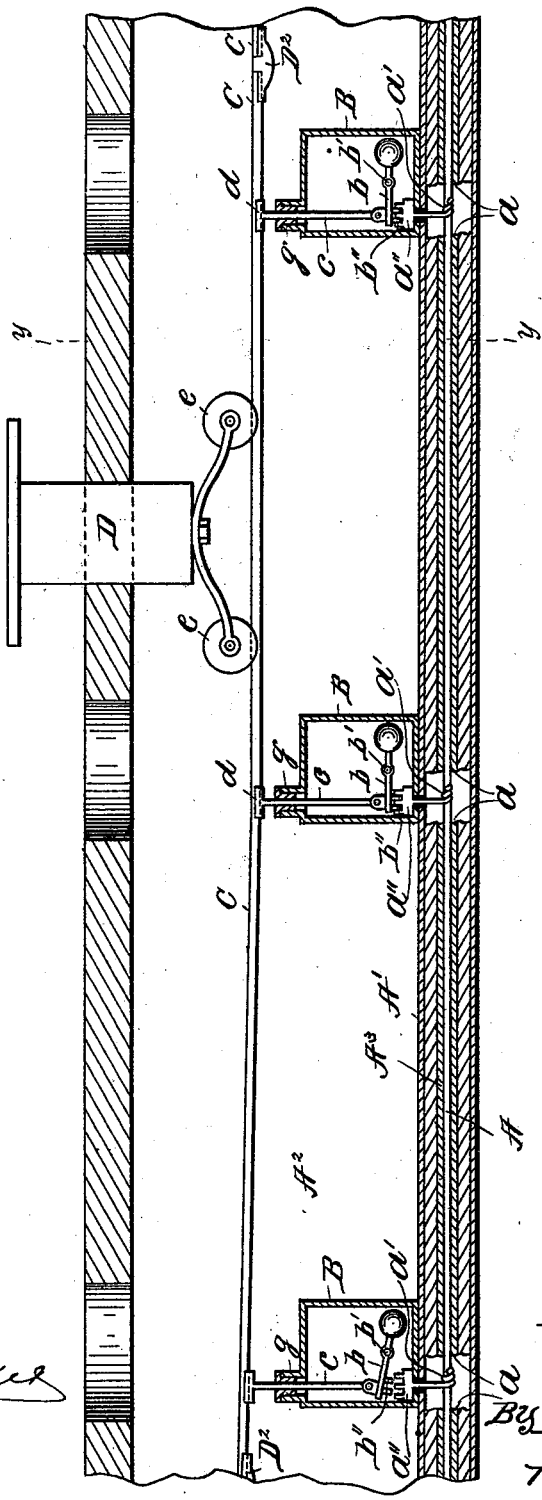
Figure 2:
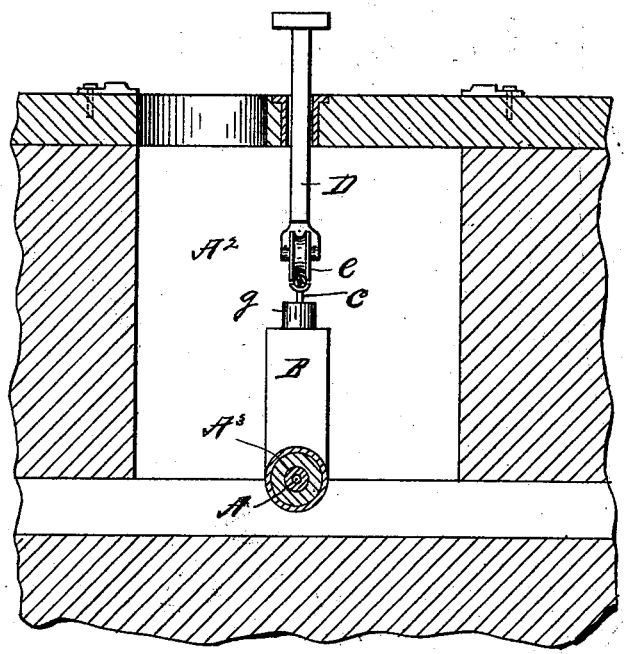

Figure 1 is a longitudinal section of my invention showing the current conveyer in full lines and taken on a line $x\,x$ of Fig. 2. Fig. 2 is a transverse section taken on line $y\,y$ of Fig. 1. Fig. 3 is a side elevation in detail showing one form of securing the insulated material to the auxiliary wire.

A indicates a suitable main wire or conductor which is insulated and incased within a suitable tubing A', or its equivalent. In the example shown the wire A is located in or contiguous to an underground conduit $A^2$. The insulation $A^3$ is broken at given points as seen at $a$ in Fig. 1; and a wire $a'$ is connected with said live wire and leads to the contact points $a''$ in a cut-out box B, the box B being shown within the conduit $A^2$. The mechanism contained in the cut-out box B consists of a weighted lever $b$ preferably fulcrumed as at $b'$, and having contact points $b''$ adapted to be brought into engagement with the contacts $a''$ as in Fig. 1. Pivoted to the lever $b$ is a vertical rod $c$, upon the outer end of which is a support $d$ upon which is secured the sectional live wire C located within the conduit $A^2$. A suitable stuffing box $g$ is provided at the upper end of box B around rod $c$.

The current conveyer D, which is connected with a suitable current distributer on a car (not shown) bears by means of its grooved contact wheels $e$ upon the sectional wire C, the contact wheels $e$ in traveling along causing said wire to be slightly depressed, or moved laterally; this movement of the wire giving a suitable movement to the contacts $b^2$ by means of the rod $c$, whereby connection is made between the main wire A and the sectional wire C at the contact $a''$, $b''$. It will be seen by the drawings that the circuit is broken at the end of each section of the wire C, the several sections of wire C being connected by suitable insulation D.

It will be understood that the main live wire A is at all times thoroughly insulated, and that the auxiliary wire C only receives the current while the car is passing over a certain section, the current of electricity being confined at that time to that section, and while the current conveyer D is actually in contact with that section. This arrangement affords security against the escape of the current from the main wire A, whereby danger of the current becoming grounded and passing to the surface of the street is overcome.

By my invention only one section of wire D will be charged with electricity at one time, excepting momentarily while the conveyer is passing over the insulation D and when its forward contact wheel is alone upon the adjacent section of wire, when these two sections will both be charged with electricity. By the means just described I avoid the dangerous sparking which would ensue if only one contact wheel were used, by the action of such single contact wheel passing from one section to the other. The conveyer D depresses only that section of the wire upon which it is bearing at any time, and as soon as it has left such section, the same is returned to its normal position by means of the weighted lever $b$, thereby breaking the circuit at $a^2$, $b^2$ of each section consecutively. The insulation between the different sections of the auxiliary wire is secured in place by screws, rivets, bolts, or in any other suitable manner, the form shown in Fig. 3 being the one I prefer to use.

Having now described my invention, what I claim is—

In a system of electric distribution, a main conductor, a contact, a connection from the main conductor to the fixed part of said contact, a weighted lever carrying the movable part of the contact, a sectional working conductor, a rod connecting the moving conductor with the weighted lever, and a water tight casing inclosing the contacts and lever, substantially as set forth.

In testimony whereof I affix my signature in presence of two witnesses.

WILLIAM LAWRENCE.

Witnesses:
MARK M. DECKER,
E. E. MEARES.